United States Patent [19]
Ito

[11] Patent Number: 5,539,594
[45] Date of Patent: Jul. 23, 1996

[54] CASSETTE PLAYER

[75] Inventor: Shinji Ito, Tokyo, Japan

[73] Assignee: Sony Corporation, Tokyo, Japan

[21] Appl. No.: 433,595

[22] Filed: May 3, 1995

Related U.S. Application Data

[63] Continuation of Ser. No. 203,699, Feb. 28, 1994, abandoned, which is a continuation of Ser. No. 856,640, Mar. 24, 1992, abandoned.

[30] Foreign Application Priority Data

Mar. 29, 1991 [JP] Japan .................. 3-093442

[51] Int. Cl.$^6$ .................................. G11B 15/68
[52] U.S. Cl. ............................................. 360/92
[58] Field of Search .................. 360/92, 93, 96.5; 369/34, 37, 38, 36, 42, 178, 196, 202, 213, 258, 292; 242/198

[56] References Cited

U.S. PATENT DOCUMENTS

| | | | |
|---|---|---|---|
| 3,127,178 | 3/1964 | Osborne et al. | 274/11 |
| 3,127,179 | 3/1964 | Osborne et al. | 360/92 |
| 3,511,508 | 12/1970 | Ban | 274/4 |
| 3,698,722 | 10/1972 | Ban | 274/4 |
| 3,807,741 | 4/1974 | Uemura | 360/92 |
| 3,821,806 | 6/1974 | Uemura | 274/4 |
| 4,484,239 | 11/1984 | Timm | 360/92 |
| 4,755,978 | 7/1988 | Takizawa et al. | 369/37 |
| 4,985,791 | 1/1991 | Yamagishi | 360/96.5 |
| 5,115,419 | 5/1992 | Akiyama et al. | 369/37 |
| 5,136,562 | 8/1992 | Staar | 369/34 |
| 5,148,332 | 9/1992 | Tomita et al. | 360/92 |

FOREIGN PATENT DOCUMENTS

| | | | |
|---|---|---|---|
| A0013806 | 8/1980 | European Pat. Off. | G11B 15/68 |
| 0060396 | 9/1982 | European Pat. Off. | |
| A0389199 | 9/1990 | European Pat. Off. | G11B 15/68 |

Primary Examiner—Robert S. Tupper
Assistant Examiner—Kevin M. Watkins
Attorney, Agent, or Firm—Jay H. Maioli

[57] ABSTRACT

A cassette player having a cassette changer function has a cassette drive mechanism on which a tape cassette is loaded and which reproduces (or records) the loaded tape cassette, and a drum-like cassette holder which holds a plurality of tape cassettes in a circle surrounding the cassette drive mechanism 8 and which is rotated so that each of the tape cassettes opposes the cassette drive mechanism in turn, the cassette holder being moved to recede into the cassette player with an arbitrary one of the tape cassettes opposed to the cassette drive mechanism, so that this tape cassette can be loaded on the cassette drive mechanism for reproducing or recording.

3 Claims, 10 Drawing Sheets

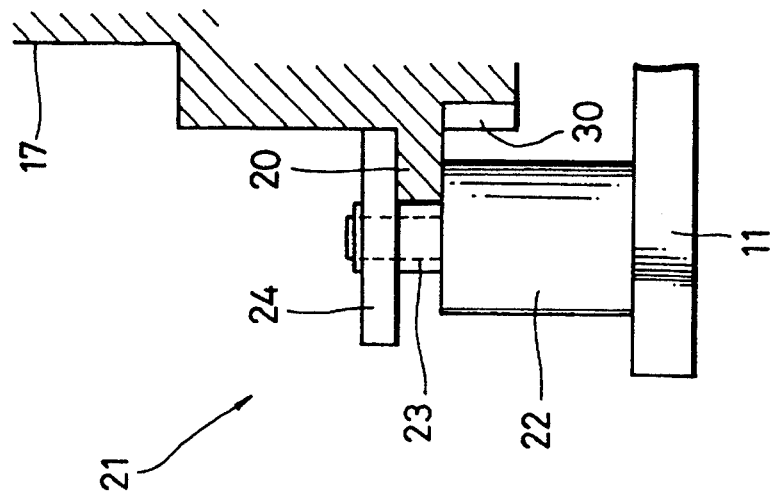
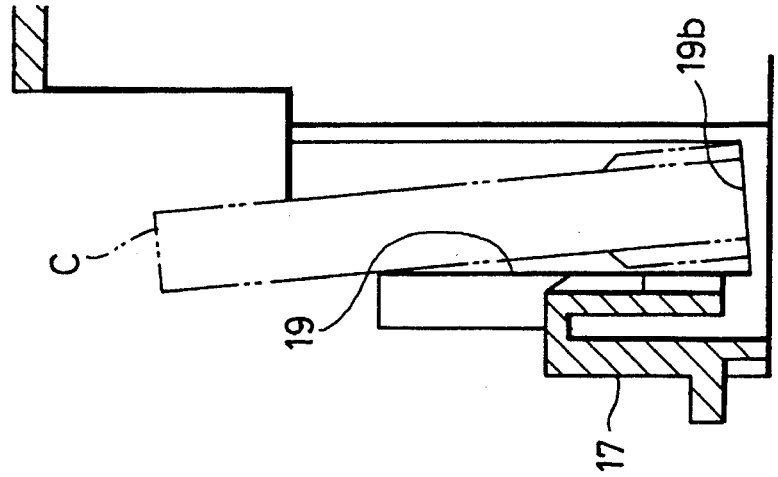
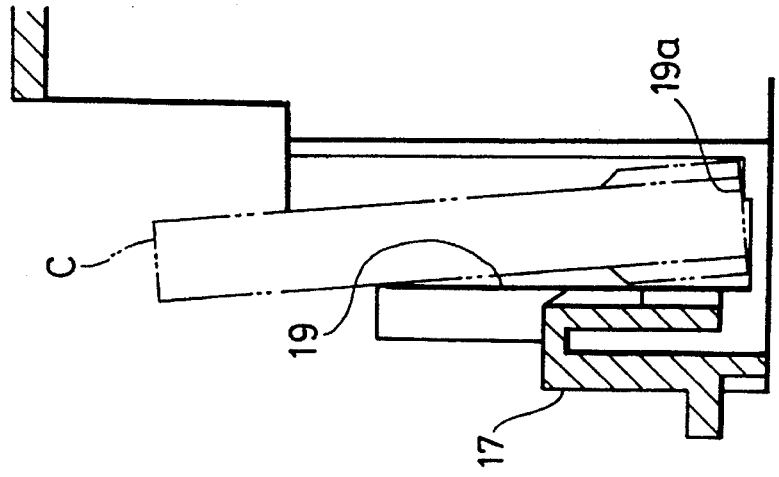

CASSETTE PLAYER

This is a continuation of application Ser. No. 08/203,699, filed Feb. 28, 1994, which was a continuation of application Ser. No. 07/865,640, filed on Mar. 24, 1992, both now abandoned.

FIELD OF THE INVENTION

The present invention generally relates to cassette players and, more particularly, to a cassette player having a so-called cassette changer function by which a plurality of tape cassettes can be continuously reproduced and/or recorded.

DESCRIPTION OF THE RELATED ART

Presently, a compact disc player, for example, is commercially available which has the so-called changer function capable of loading a plurality of discs on trays for continuous reproduction of the discs.

On the other hand, a cassette player for recording (or reproducing) a tape cassette is also desired to have the changer function. However, a practically inexpensive and simple mechanism for the tape cassette player having the cassette changer function has not been proposed yet.

As described above, a decisive mechanism for the cassette player having the cassette changer function is not yet realized in real circumstances and the cassette player with the cassette changer function is not yet commercially available on the market although the need of such cassette player is severe.

OBJECTS AND SUMMARY OF THE INVENTION

In view of the aforesaid drawbacks of the prior art, it is an object of the present invention to provide a cassette player with a cassette changer function in which the above-mentioned problems of the prior art can be solved.

More specifically, it is an object of the present invention to provide a cassette player with a cassette changer function of a simple arrangement.

Another object of the present invention is to provide a cassette player with a cassette changer function which can be inexpensively.

As an aspect of the present invention, a cassette player in which a plurality of tape cassettes is exchanged to record and/or reproduce a signal is comprised of a tape drive mechanism for transporting a tape housed in the tape cassette, a cassette holder, which is of a drum-shaped configuration encircling the cassette drive mechanism, housing the plurality of tape cassettes and being rotated in such a fashion that one tape cassette is opposed to the tape drive mechanism, a rotation drive mechanism for rotating the cassette holder such that one of the plurality of tape cassettes is opposed to the tape drive mechanism, and a mechanism for moving the cassette holder in a straight line fashion so that the tape cassette is loaded onto the tape drive mechanism.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which:

FIG. 10 is a side view of a cassette compartment of the cassette holder;

FIG. 11 is a side view of another example of the cassette compartment portion of the cassette holder; and FIG. 12 is a side view of a guide mechanism which guides an outer peripheral portion of the cassette holder.

DETAILED DESCRIPTION OF THE PREFERRED EMBODIMENT

Figure 1:
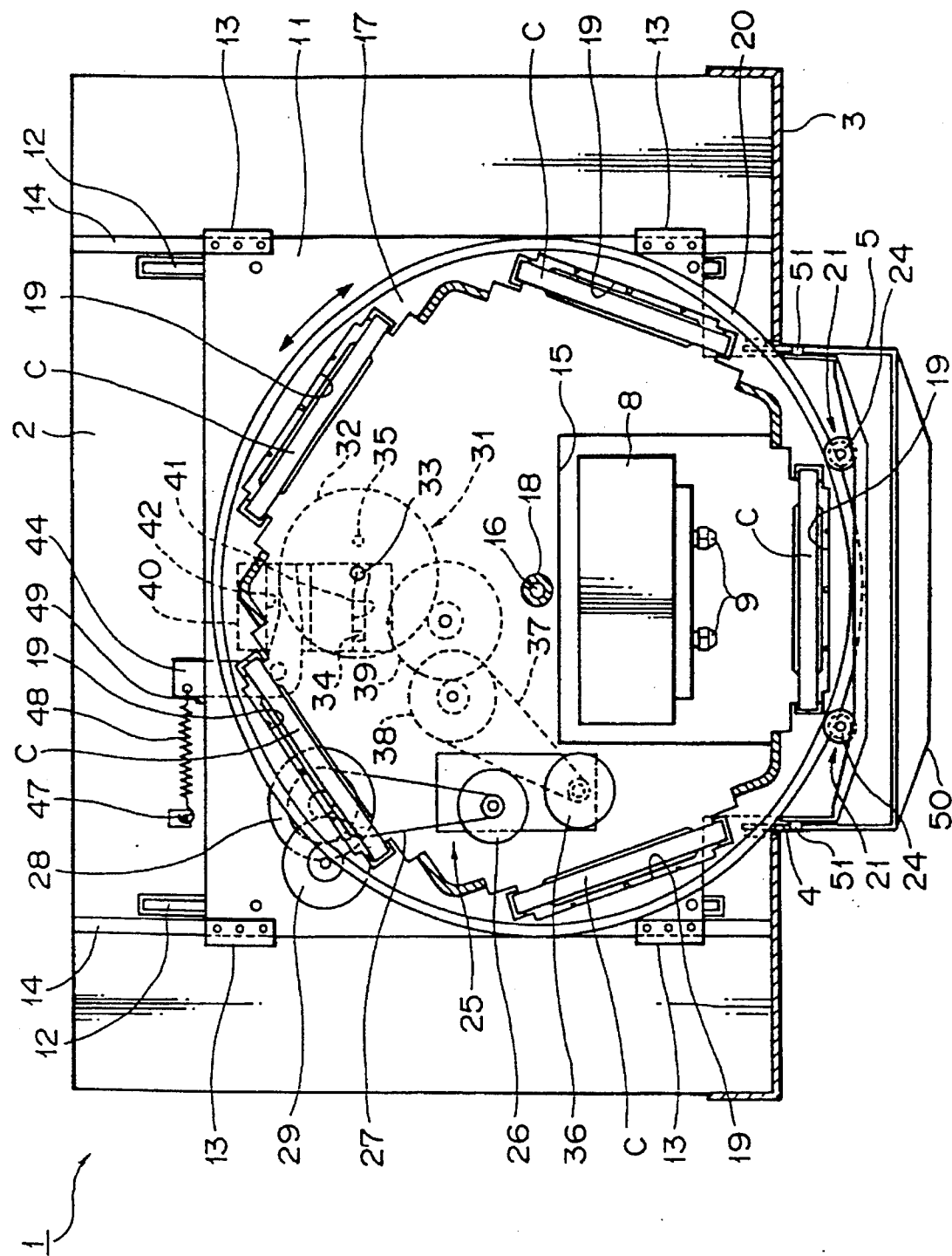
FIG. 1 is a partly cut-away plan view of a cassette player with a cassette changer function according to an embodiment of the present invention and illustrating the condition such that a cassette holder is placed in the front moved position (first position)

The present invention will now be described in detail with reference to the accompanying drawings.

As illustrated, there is generally shown a cassette player 1 (cassette recording and/or reproducing apparatus). There are also shown a base chassis 2 and a front panel 3 mounted on the front of this base chassis 2. A cassette mouth 4 is formed at the center of the front panel 3. A front lid 5 is mounted to be rotatable forward and backward around pivots 7 of bearings 6, thus opening or closing the cassette mouth 4. The bearings 6 are erected from the base chassis 2 at the lower left and right ends of the cassette mouth 4, and the pivots 7 are provided at the bearings 6 so as to project left and right, respectively. The front lid 5 is made of a transparent resin so that the user can visually confirm the inside of the cassette player. Further, the front lid 5 is constantly spring-biased by a predetermined spring means in the rearward, i.e., in the closing direction though not shown.

A cassette drive mechanism (i.e., so-called mechanical deck) 8 is secured to the front center of the base chassis 2 in an opposing relation to the front lid 5. The cassette drive mechanism 8 is composed of a reel drive shaft 9, a capstan 10 and other suitable members such as a magnetic transducer head, a pinch roller or the like, though not shown, similar to that of the ordinary cassette player. Under the condition that the tape cassette is loaded onto the cassette drive mechanism 8, the reel drive shaft 9 and the capstan 10 are rotated and the magnetic transducer head and the pinch roller (not shown) are inserted into the cassette drive mechanism 8 through the opening portion of the cassette tape, thereby the playback (or the recording) being carried out.

A slide chassis 11 is supported on the base chassis 2 so that it becomes freely slidable in the front and rear directions. More specifically, a pair of support rails 12 extending longitudinally from the front to the rear are secured to the left and right sides of the base chassis 2 and the slide chassis 11 is mounted on the supporting rails 12. Front and rear guide members 13 are attached to left and right respective end portions of the slide chassis 11. The guide members 13 slide along left and right guide rails 14 provided on the base chassis 2, whereby the slide chassis 11 is moved in the front and rear direction in a straight line fashion under the condition such that it is inhibited from being moved in the lateral direction. The slide chassis 11 has on the front center thereof formed an opening 15 which avoids the cassette drive mechanism 8 so that the slide chassis 11 can be smoothly slid in the front and rear directions without bothering the cassette drive mechanism 8.

A support shaft 16 is vertically erected from the central portion of the slide chassis 11 and a cassette holder 17 is rotatably supported to the support shaft 16. The cassette holder 17 is shaped as a drum-like configuration having a head lining portion and rotatably engaged at its tubular bearing portion 18 to the support shaft 16 to house therein a plurality of tape cassettes C, encircling the cassette drive mechanism 8. In this embodiment, five cassette compartments 19 of pocket configuration are provided in the circumferential direction and the tape cassettes C are respectively accommodated within the cassette compartments 19 in an erect state.

In order to prevent the tape cassette C thus accommodated from being moved recklessly within the cassette compartment 19, each of the cassette compartments 19 is designed so as to hold the tape cassette C under the condition such that the tape cassette C is inclined beforehand toward the outside of the cassette holder 17. According to this embodiment, as shown in FIG. 10, an inside portion (near the rotation center of the cassette holder 17) of the bottom of the cassette compartment 19 is protruded to form a stepped portion 19a. When the tape cassette C inserted into the cassette compartment 19 is abutted against the stepped portion 19a, then the tape cassette C is urged to come in contact with the outer edge portion of the cassette compartment 19. Since the tape cassette C is inclined beforehand within the cassette compartment 19, the tape cassette C can be prevented from being recklessly moved in the inside and outside direction. Alternatively, the stepped portion 19a might be replaced with an inclined portion 19b inclined toward the outside on the bottom portion of the cassette compartment 19 as shown in FIG. 11 with similar effects being achieved.

Since the cassette holder 17 of drum configuration is supported only by the central portion of the slide chassis 11 and is not stable from this standpoint, the cassette holder 17 is supported at portions of its outer circumferential portion by predetermined portions of the slide chassis 11, thereby being prevented from escaping the slide chassis 11. More specifically, a rib 20 is formed around the outer circumferential surface of the cassette holder 17, and guide mechanisms 21 are formed at left and right front end portions of the slide chassis 11 opposing the cassette drive mechanism 8 so as to hold the rib 20 in the horizontal direction. As shown in FIG. 12, the guide mechanism 21 is comprised of a pedestal member 22 vertically secured to the slide chassis 11 and a disk-shaped roller 24 rotatably attached to the upper surface of the pedestal member 22 by means of a shaft 23. Since the rib 20 is held and guided between the pedestal member 22 and the disk-shaped roller 24, the cassette holder 17 can be stably rotated with its outer circumferential portion being prevented from escaping the slide chassis 11.

A rotation drive mechanism 25 for rotating this cassette holder 17 is provided on the slide chassis 11. More specifically, a drive motor 26 is fixed to the slide chassis 11 at a certain place, and the rotation of the drive motor 26 is transmitted through a transmission belt 27 to deceleration gears 28, 29. These deceleration gears 28, 29 are rotatably mounted on the slide chassis 11, and the deceleration gear 29 is meshed with a gear-formed surface 30 which is formed on the entire outer circumferential surface of the cassette holder 17. Thus, when the drive motor 26 is rotated, the rotation force is transmitted through the transmission belt 27 and the deceleration gears 28, 29 to the cassette holder 17. Therefore, the cassette holder 17 is rotated so that the tape cassette C held in each cassette compartment 19 faces the cassette driving mechanism 8 sequentially.

Moreover, a movement cam mechanism 31 is provided between the base chassis 2 and the slide chassis 11 so as to move the cassette holder 17 linearly, thus loading or unloading the tape cassette C from the cassette driving mechanism 8. Since the cassette holder 17, as described above, is supported on the slide chassis 11 which is supported to be slidable in the forward and backward direction relative to the base chassis 2, the cassette holder 17 can be moved linearly in the forward and backward direction together with the slide chassis 11 by the movement cam mechanism 31. This movement cam mechanism 31 is constructed as follows.

A disk-like cam gear 32 as a rotation cam is rotatably supported on the underside of the slider chassis 11 at its center through a pivot 33. This cam gear 32 has a first cam pin 34, and second cam pin 35 which is located at rightly the opposite side of the pivot 33 to the first pin 34, or at an angle of 180° relative to the first cam pin 34. The second cam pin 35 is located closer to the rotation center than the first cam pin 34. A drive motor 36 is adapted to drive this cam gear 32 to rotate. That is, the rotation of the drive motor 36 is transmitted and decelerated through the transmission belt 37 and deceleration gears 38, 39 to the cam gear 32.

A fixed cam 40 is fixed to the base chassis 2 so as to oppose the cam gear 32. The fixed cam 40 has a first cam groove 41 and a second cam groove 42 which are arranged so that one is closer to the front and the other is closer to the back. The first cam groove 41 and the second cam groove 42 are extended, substantially straight to have a certain length, in the direction perpendicular to the direction in which the slide chassis 11 is moved. The distance between the first and second cam grooves 41 and 42 is substantially equal to that between the first cam pin 34 and the second cam pin 35 of the cam gear 32. As will be described later, the first and second cam pins 34 and 35 of the cam gear 32 are moved over and engaged in the first and second cam grooves 41 and 42 of the fixed cam 40, and thus the slide chassis 11 is moved forward or backward relative to the base chassis 2.

This movement cam mechanism 31 has a limiter mechanism 43 which operates when the slide chassis 11 reaches its rearmost position. That is, according to this embodiment, a limiter arm 44 of an L-letter configuration is rotatably mounted through a pivot 45 on the base chassis 2 at a location near the fixed cam 40. One end portion 44a of this limiter arm 44 is positioned within a wide groove 46 which is formed in the fixed cam 40. The above second cam groove 42 is positioned between the one end portion 44a of the limiter arm 44 and the rear side surface of the groove 46.

A limiter spring 48 is extended between the other end 44b of the limiter arm 44 and a projection 47 provided at a point on the base chassis 2. The limiter arm 44 is constantly spring-biased by the spring-biasing force of the spring 48 to rotate in the counter-clockwise direction as illustrated or so that the one end 44a is rotated rearwards. When this limiter arm 44 is in the normal condition, the limiter spring 48 forces the edge of the other end 44b to be brought in contact with a stopper 49 which is provided to be erect on the base chassis 2. Thus, the second cam groove 42 is kept to have a predetermined width. When the slider 11 has been moved to the rearmost position, the second cam pin 35 of the cam gear 32 pushes this limiter arm 44 against the spring-biasing force of the limiter spring 48.

Operation of the cassette player thus constructed according to this embodiment will be described below.

Figure 4:
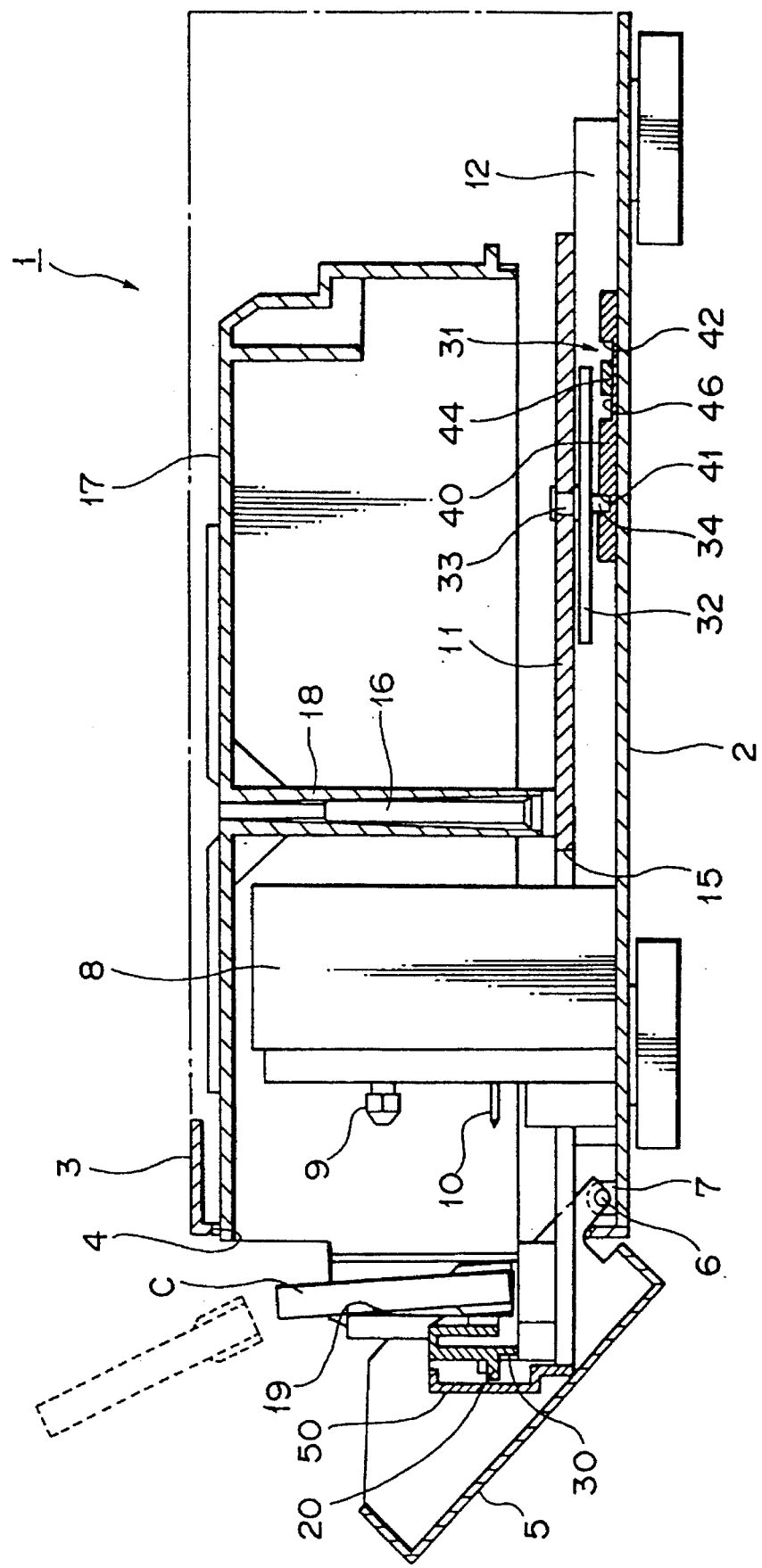
FIG. 4 is a longitudinal cross-sectional side view of the embodiment of the present invention and illustrating the condition such that the cassette holder is placed in the front moved position (first position)
Figure 7:
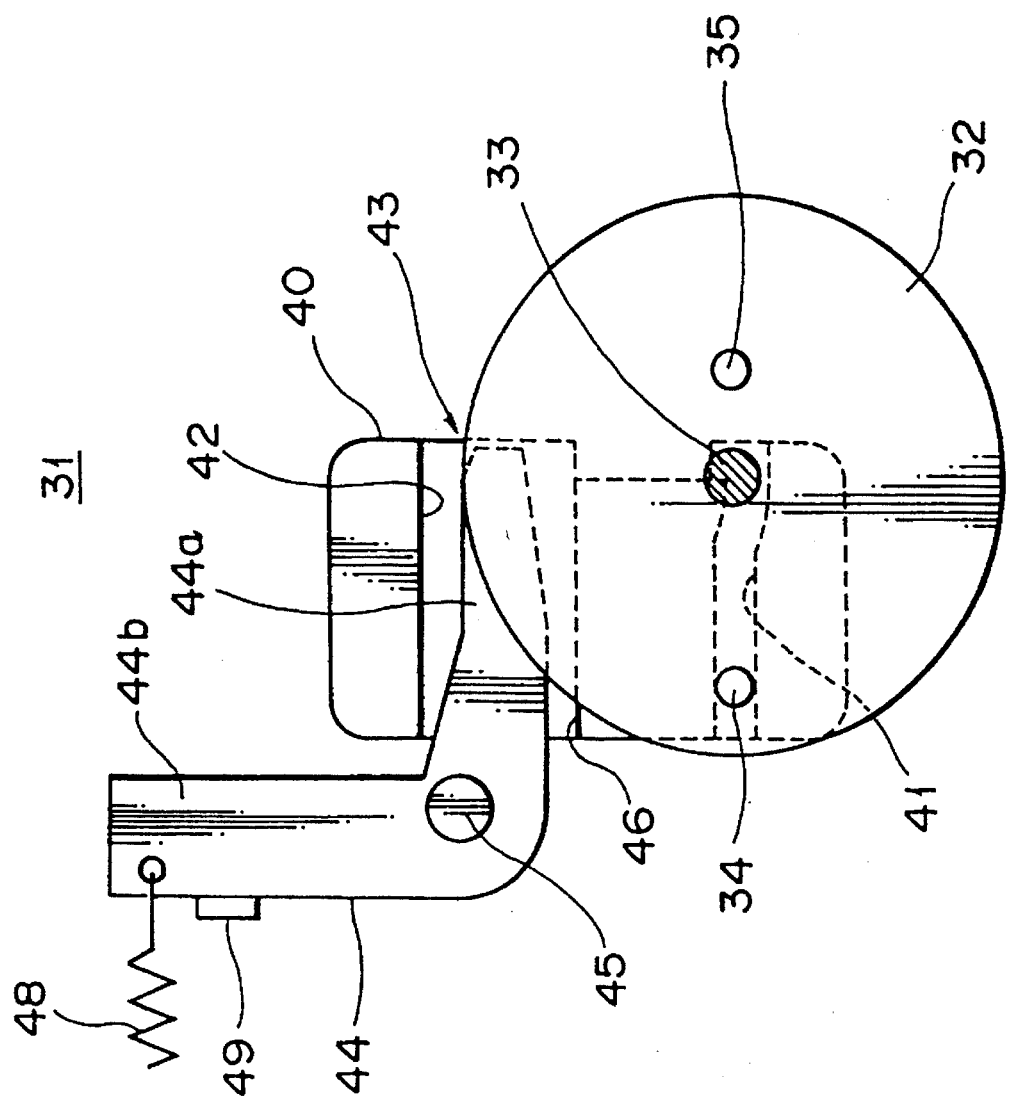
FIG. 7 is a schematic diagram used to explain operation of a moving cam mechanism of the present invention and which corresponds to FIG. 1.

FIGS. 1, 4 and 7 show the condition such that the slide chassis 11, or the cassette holder 17 is in the most forward end position (first position). In this position, the movement cam mechanism 31 is situated in the condition such that only the first cam pin 34 of the cam gear 32 is engaged in the first cam gear 41 of the fixed cam 40 (see FIG. 7).

When the slide chassis 11 is in the most forward end position, projections 51, which are provided on both left and right sides of a cover member 50 that is mounted on the front of the slide chassis 11, push the left and right sides of the front lid 5 from the inside, thus opening the front lid 5 against the spring-biasing force for closing. A part of the cassette holder 17 is exposed to the outside of the cassette player through the mouth 4, so that the tape cassette C can be loaded in or unloaded from the cassette compartment 19. At this position, the cassette holder 17 is made rotatable. When the cassette holder 17 is rotated by the drive motor 26 of the rotation drive mechanism 25, the tape cassettes can be exchanged at the following cassette compartments 19.

When the drive motor 36 of the movement cam mechanism 31 is driven to rotate the cam gear 32 in the counter-clockwise direction as illustrated, the cam gear 32 is relatively moved backward to the fixed cam 40 since the first cam pin 34 is engaged in the first cam groove 41 of the fixed cam 40. Thus, the slide chassis 11, or cassette holder 17 is moved backward.

Figure 2:
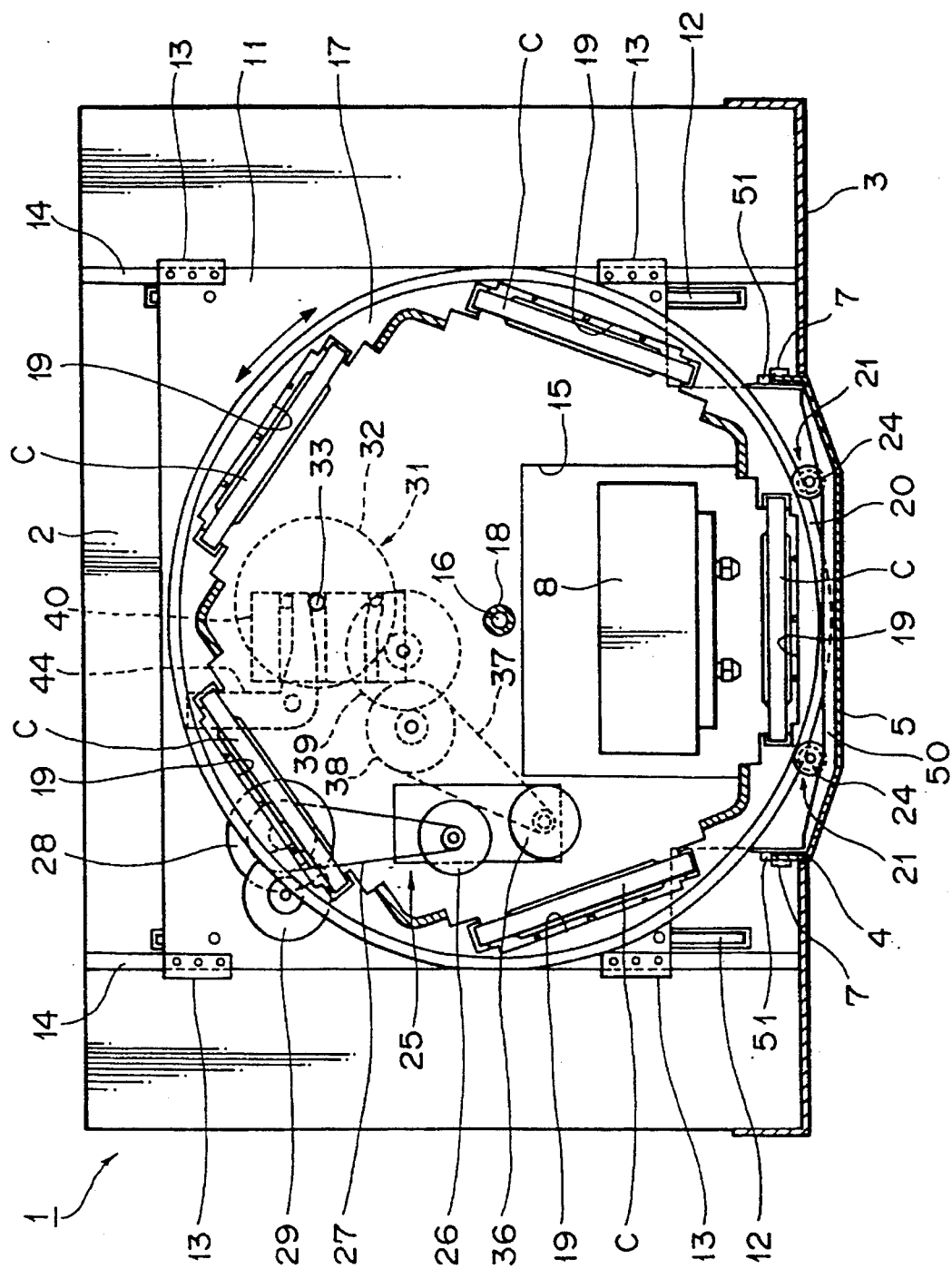
FIG. 2 is a partly cut-away plan view of a cassette player with a cassette changer function according to the embodiment of the present invention and illustrating the condition such that the cassette holder is placed in the intermediate moved position (second position)
Figure 5:
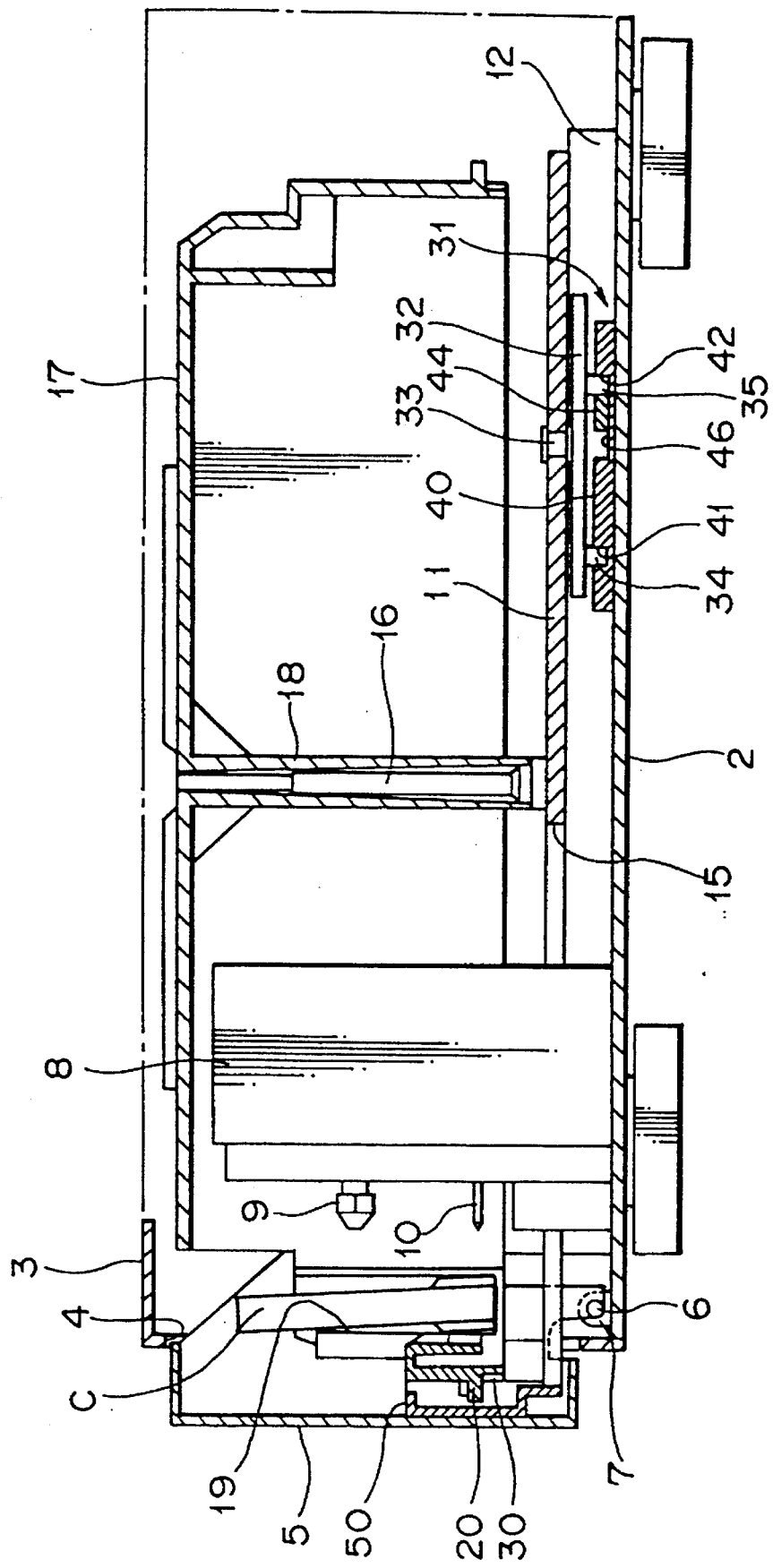
FIG. 5 is a longitudinal cross-sectional side view of the embodiment of the present invention and illustrating the condition such that the cassette holder is placed in the intermediate moved position (second position)
Figure 8:
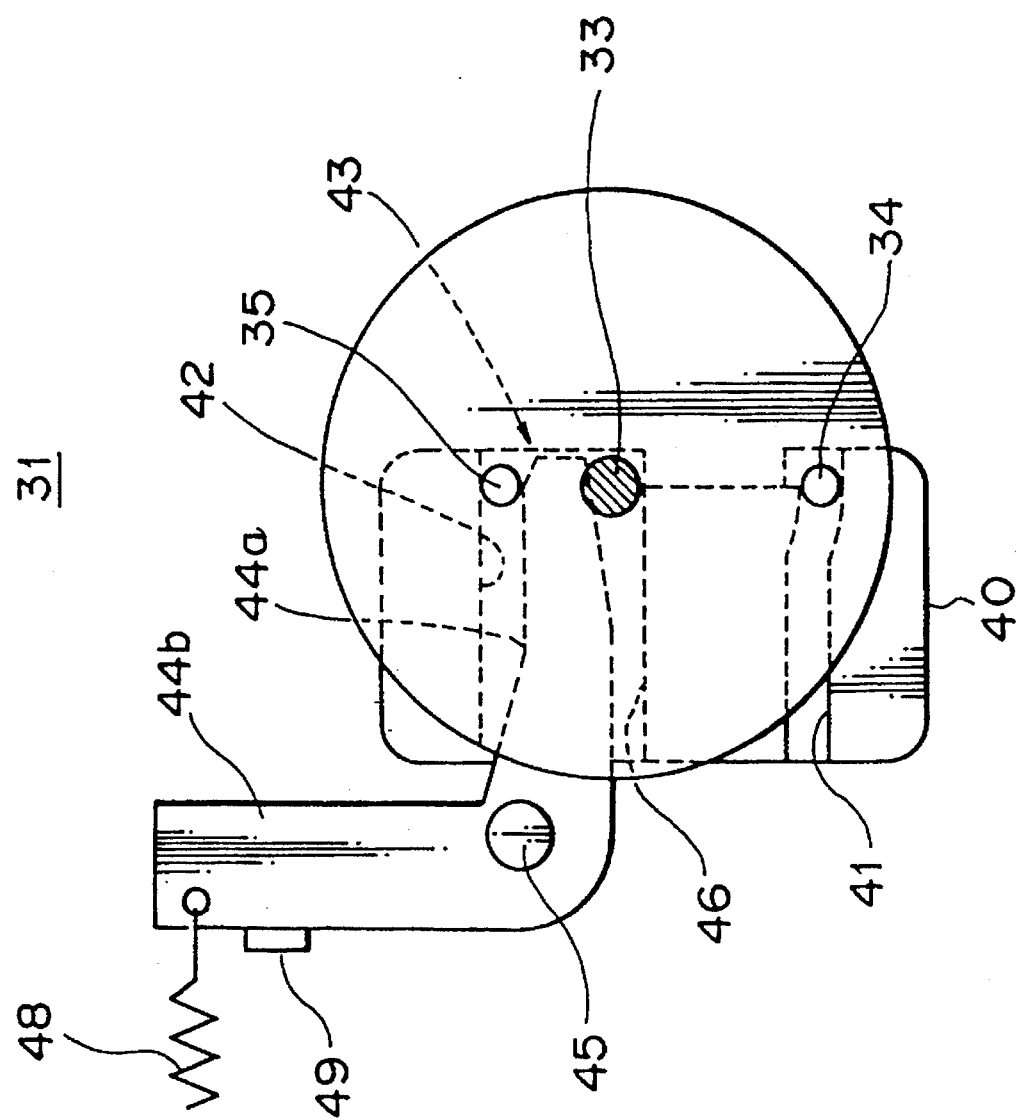
FIG. 8 is a schematic diagram used to explain operation of the moving cam mechanism of the present invention and which corresponds to FIG. 2.

FIGS. 2, 5 and 8 show the situation such that the slide chassis 11, or the cassette holder 17 recedes from the position shown in FIGS. 1 and 4 to the intermediate position (second position). When the movement mechanism 31 is situated in this intermediate position, the first and second cam pins 34 and 35 of the cam gear 32 are respectively engaged in the first and second cam grooves 41 and 42 of the fixed cam 40 (see FIG. 8). Under this condition, the straight line connecting the first cam pin 34 and second cam pin 35 of the cam gear 32 coincides with the movement direction of the slide chassis 11. In other words, the cam gear 32 is in the dead point, and thus the cam gear is not inadvertently rotated even if a small force is applied to the slide chassis 11. Thus, the slide chassis 11 is reliably maintained in a fixed state, or the cassette holder 17 is never shifted in its position.

Under the condition such that the slide chassis 11 has receded to the intermediate position, the front lid 5 is released from being pressed by the slide chassis 11, and thus the front lid 5 is closed. Therefore, the cassette holder 17 is completely drawn back into the cassette player. Even in this position, the cassette holder 17 is able to rotate. When the cassette holder 17 is rotated by the drive motor 26 of the rotation drive mechanism 25, a tape cassette to be reproduced (or recorded) is selected.

When the selected tape cassette C is positioned to face the front of the cassette drive mechanism 8, the cam gear 32 is further rotated in the counter-clockwise direction by driving the drive motor 36 of the movement cam mechanism 31, whereby the first cam pin 34 of the cam gear 32 is disengaged from the first groove 41 of the fixed cam 40. However, since the second cam pin 35 is engaged in the second cam groove 42, the cam gear 32 is relatively moved backward to the fixed cam 40 and thus the slide chassis 11, or the cassette holder 17 is further moved to recede.

Figure 3:
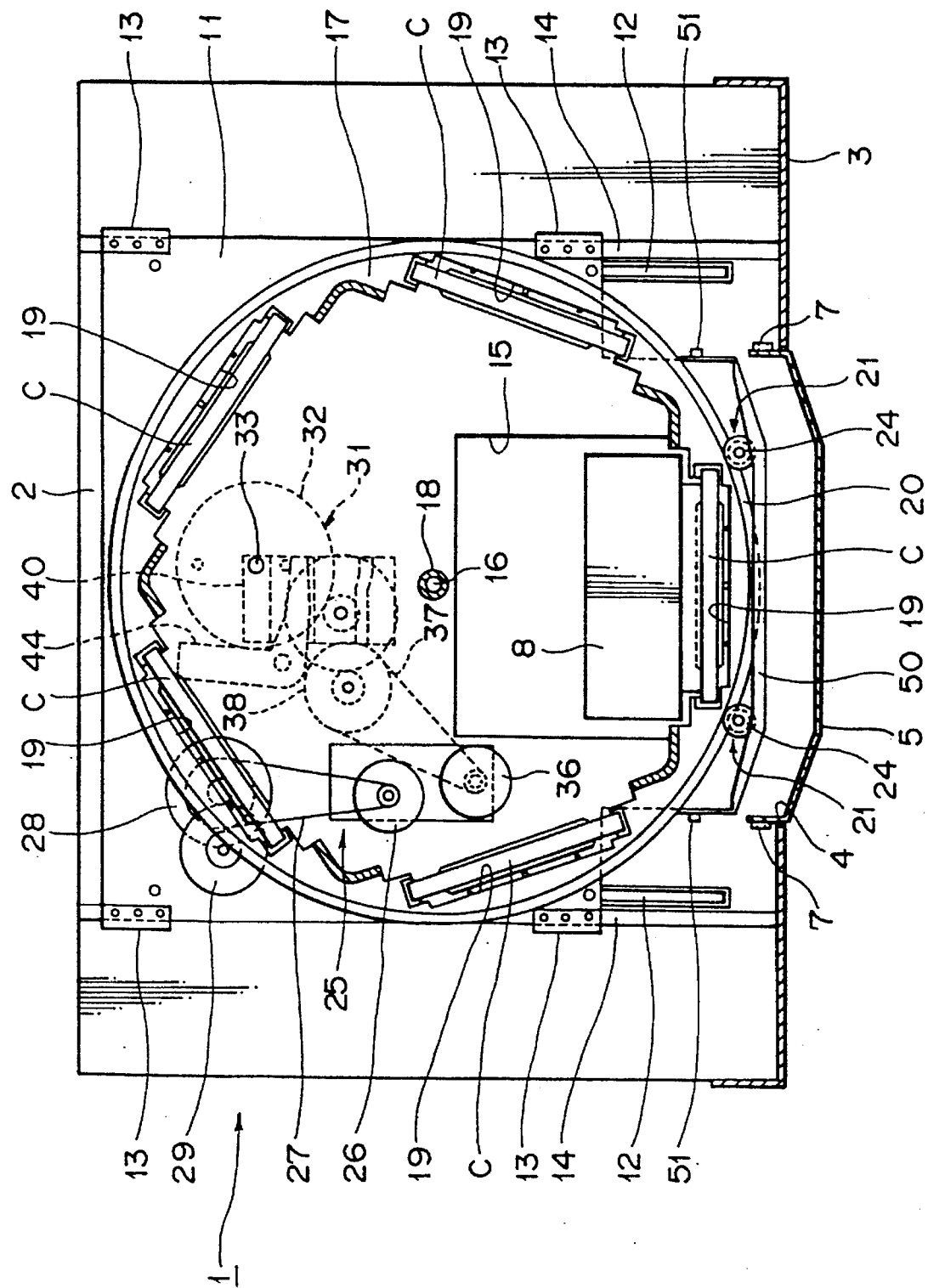
FIG. 3 is a partly cut-away plan view of a cassette player with a cassette changer function according to the embodiment of the present invention and illustrating the condition such that the cassette holder is placed in the rear moved position (third position)
Figure 6:
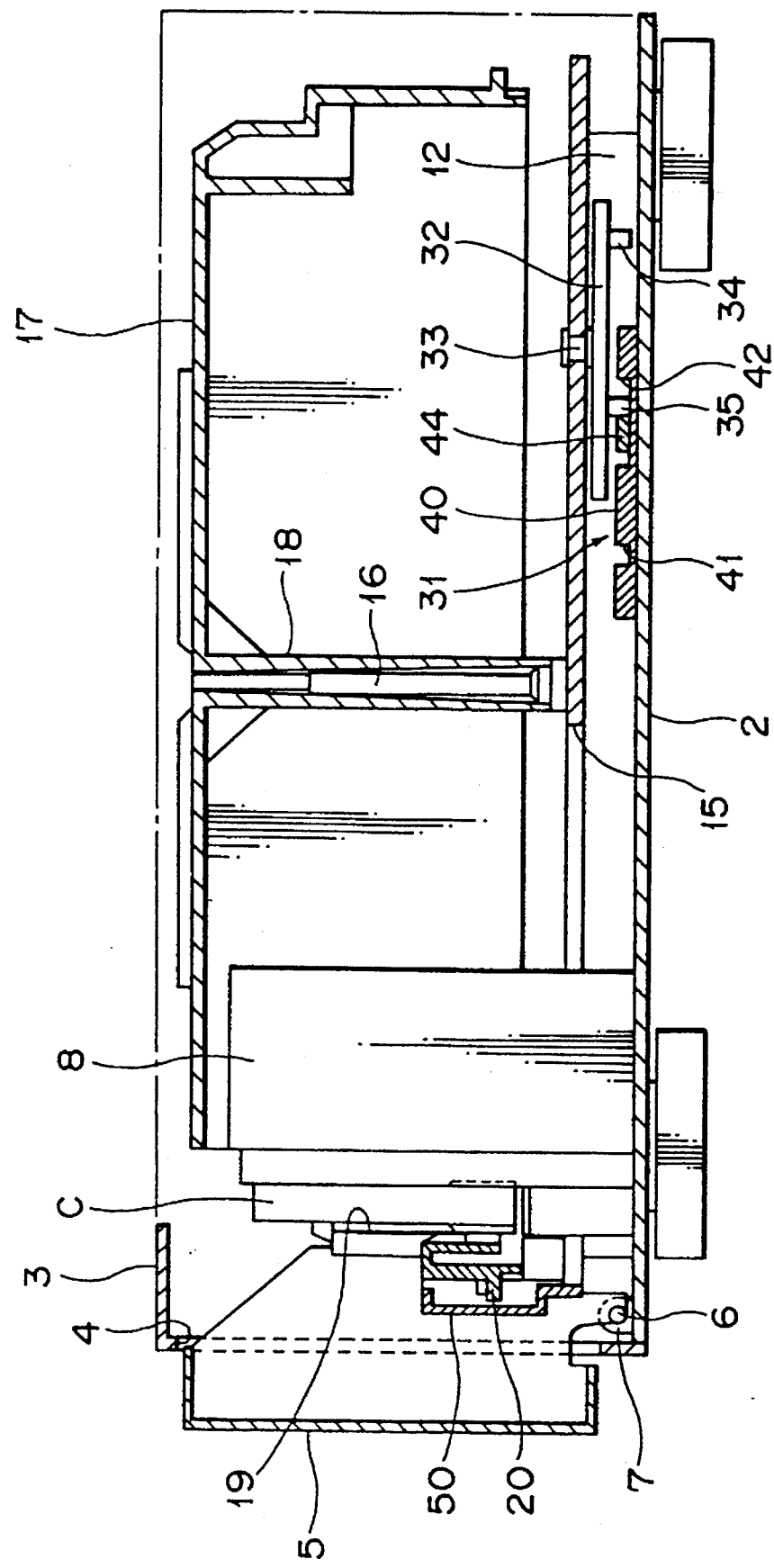
FIG. 6 is a longitudinal cross-sectional side view of the embodiment of the present invention and illustrating the condition such that the cassette holder is placed in the rear moved position (third position)
Figure 9:
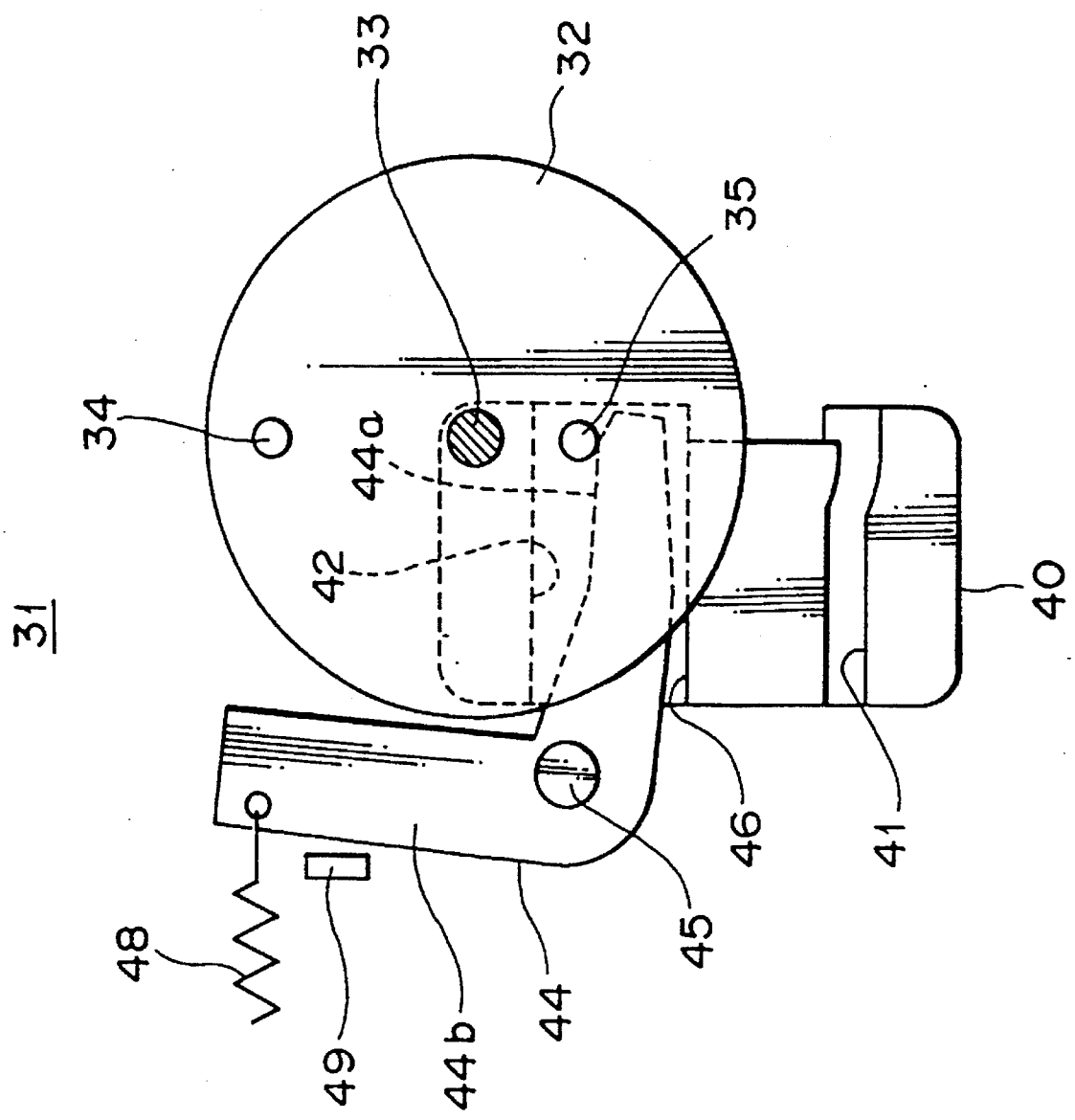
FIG. 9 is a schematic diagram used to explain operation of the moving cam mechanism of the present invention and which corresponds to FIG. 3.

FIGS. 3, 6 and 9 show the condition such that the slide chassis 11, or the cassette holder 17 has been further moved to recede from the position shown in FIGS. 2 and 5 and to reach the rearmost position (third position). In this position, the selected tape cassette C is loaded on the cassette drive mechanism 8, and the cassette holder 17 is unable to rotate. That is, when the cassette holder 17 is moved to recede from the condition that the tape cassette selected as shown in FIGS. 2 and 5 is located to oppose the front of the cassette drive mechanism 8, the tape cassette is moved together therewith and loaded on the cassette mechanism 8.

In the loading operation of the tape cassette C on the cassette drive mechanism 8, since the outer circumferential portion of the cassette holder 17 is guided by the guide mechanism 21 as described above, the tape cassette C can be smoothly loaded on the cassette drive mechanism 8. In other words, since the cassette holder 17 is prevented from floating up by the left and right guide mechanism 21, the tape cassette C held by the cassette holder 17 constantly keeps its correct height relative to the cassette drive mechanism 8. Therefore, the tape cassette can be reliably loaded on the cassette drive mechanism 8 without being caught.

When the slider chassis 11 is situated in the rearmost position, the limiter mechanism 43 of the movement cam mechanism 31 is in the operable state. In other words, as will be obvious from FIG. 9, the second cam pin 35 of the cam gear 32 pushes the limiter arm 44 forward against the spring-biasing force of the limiter spring 48, and thus the spring-biasing force of the limiter spring 48 is transmitted to the slide chassis 11 through the limiter arm 44 and cam gear 32. Therefore, the slide chassis 11, or the cassette holder 17 is spring-biased, or urged to move backward. Consequently, the tape cassette is urged against the cassette drive mechanism 8 by the cassette holder 17 so that it can be stably loaded onto the cassette drive mechanism 8 without chattering and correctly reproduced (or recorded).

As described above, according to this embodiment, any one of the five tape cassettes held within the cassette holder 17 can be selected and reproduced (or recorded). After the end of the reproduction (or recording) of the selected tape cassette, the cam gear 32 of the movement cam mechanism 31 is rotated in the opposite direction, or in the clockwise direction so that the cassette holder 17 is returned to the intermediate position shown in FIGS. 2 and 5. Then, the tape cassette is unloaded from the cassette drive mechanism 8. Thus, the cassette holder 17 is able to rotate and the next tape cassette can be selected. According to this embodiment, the five tape cassettes can be continuously reproduced (or recorded) without taking in or out tape cassettes.

This embodiment of the player, as described above, is a changer-function-incorporated cassette player having a cassette holder 17 of a drum-like configuration which is able to hold five tape cassettes C therewithin. When this cassette holder 17 is moved forward and backward by the movement cam mechanism 31, one tape cassette can be loaded on or unloaded from the cassette drive mechanism 8, and thus five tape cassettes can be continuously reproduced (or recorded) with a simple arrangement.

Moreover, according to this embodiment of the cassette player, since the guide mechanism 21 is provided for guiding the outer circumferential position of the cassette holder 17 at two places opposite to the cassette drive mechanism 8, thus preventing the cassette holder 17 from floating up, the tape cassette can be smoothly and surely loaded on the cassette drive mechanism 8.

In addition, according to this embodiment, since the movement cam mechanism 31 for moving the cassette holder 17 forward and backward is a special mechanism different from the general cam mechanism, the movement cam mechanism 31 is constructed to be compact. In other words, the movement cam mechanism 31 in this embodiment is constructed so that when the cam gear 32 is rotated, the cam gear 32 is moved relative to the fixed cam 40, whereby the slide chassis 11 is moved forward and backward relative to the base chassis 2. The movement of the slide chassis 11 between the most forward end position and the intermediate position is made by the engagement of the first cam pin 34 of the cam gear 32 with the first cam groove 41 of the fixed cam 40. The movement of the slide chassis 11 between the intermediate position and the last end position is made by the engagement of the second cam pin 35 with the second cam groove 42. In other words, when the cam gear 32 is rotated, the first and second cam pins 34 and 35 are moved over and engaged with the first and second cam grooves 41 and 42, whereby the slide chassis 11 is moved relative to the base chassis 2. Therefore, for a constant stroke of movement the cam gear 32 can be constructed to have a smaller diameter than the general cam mechanism, and thus the size of the movement cam mechanism 31 can be reduced by the amount corresponding to the diameter-reduction of the cam gear 32.

Furthermore, according to this embodiment, since the movement cam mechanism 31 for moving the cassette holder 17 forward and backward is provided with a limiter mechanism 43 for pressing the tape cassette C against the cassette drive mechanism 8, each cassette compartment 19 of the cassette holder 17 is not required to have a limiter mechanism for pressing the tape cassette against the cassette driving mechanism 8. Thus, the construction of the cassette holder 17 can be simplified.

This embodiment is realized as a changer-function-incorporated cassette player having its own peculiar structures everywhere, a simple construction and high performance for accurate operation.

According to this invention as described above, the tape cassette player has a cassette drive mechanism for reproducing or recording a tape cassette loaded thereon, a drum-shaped cassette holder which holds a plurality of tape cassettes in a circle surrounding said cassette drive mechanism and which is rotated so that each of said tape cassettes opposes said cassette drive mechanism in turn, and a movement mechanism for moving said cassette holder straight between the position in which said tape cassettes can be drawn in or out of said cassette holder and in which said cassette holder can be rotated, and the position in which said cassette cannot be rotated under the condition in which one of said tape cassettes is loaded on said cassette drive mechanism. Therefore, a plurality of said tape cassettes can be continuously reproduced or recorded with a simple construction, and thus this cassette player can contribute to the practical use of a changer-function-incorporated tape cassette player which has not been realized so far. In addition, since this cassette player has a simple construction, it can be made inexpensively.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A tape cassette player for recording and/or reproducing a plurality of tape cassettes comprising:

a chassis;

a sub-chassis slidably mounted on said chassis;

a drum-shaped cassette holder rotatably mounted on said sub-chassis and having an upstanding cylindrical wall on which said plurality of tape cassettes are independently held at spaced intervals;

drive means for rotating said holder so as to transport a selected one of said plurality of tape cassettes to a first position at a certain rotary angle;

a stationary tape transport mechanism fixedly mounted on said chassis so as to be surrounded by and spaced apart from said cylindrical wall of said holder, said tape transport mechanism including reel drive shafts extending in a first direction towards said first position; and tape cassette loading means for moving said sub-chassis and said holder linearly along said first direction in which said reel drive shafts extend, wherein said one of said plurality of tape cassettes in said first position moves linearly in accordance with the movement of said holder to a second position in which said one of said plurality of tape cassettes is engaged with said reel drive shafts, wherein said sub-chassis is slidably supported on said chassis so as to freely move linearly in said first direction between a front side of said chassis and a rear side thereof, and wherein said tape cassette loading means supports said cassette holder on said slide chassis and comprises a rotating cam gear having first and second cam pins protruding from a surface thereof, said cam gear being pivotally attached to one of said chassis and said sub-chassis, and said tape cassette loading means further comprises first and second lateral cam grooves provided on the one of said chassis and said sub-chassis not having the rotating cam gear attached thereto, said first and second cam grooves being oriented in a second direction perpendicular to said first direction, and wherein said first and second cam pins are engaged and moved across said first and second cam grooves respectively by a rotation of said rotating cam, thereby linearly moving said sub-chassis relative to said chassis.

2. A cassette player according to claim 1 further comprising a rib formed around an outer circumferential surface of said cassette holder and a guide mechanism mounted on said sub-chassis for guiding said rib so that said outer circumferential surface remains level in a horizontal plane.

3. A cassette player according to claim 1 wherein said cassette holder has peripheral cassette compartments formed along said cylindrical wall and has formed on a bottom surface of a cassette compartment thereof one of a stepped profile and an inclined profile for holding and housing said tape cassettes in an inclined state.

* * * * *